United States Patent [19]
Nakagaki et al.

[11] Patent Number: 5,657,316
[45] Date of Patent: Aug. 12, 1997

[54] DATA LENGTH COMPENSATING DEVICE FOR COMPENSATING LOST CELLS IN PACKET DATA COMPOSED OF A PLURALITY OF CELLS

[75] Inventors: Tatsuru Nakagaki; Toshio Irie, both of Kawasaki, Japan

[73] Assignee: Fujitsu Limited, Kanagawa, Japan

[21] Appl. No.: 574,245

[22] Filed: Dec. 18, 1995

[30] Foreign Application Priority Data

Jan. 23, 1995 [JP] Japan .................. 7-007898

[51] Int. Cl.⁶ ............................................ H04J 3/14
[52] U.S. Cl. .......................... 370/394; 370/395; 370/470
[58] Field of Search ....................... 370/60, 60.1, 94.1, 370/94.2, 94.3, 13, 17, 99, 100.1, 102, 105.3, 105.4, 105.5, 110.1, 82, 83, 58.1–58.3; 375/354, 363, 368, 369; 340/825.14, 825.2

[56] References Cited

U.S. PATENT DOCUMENTS 5,050,166  9/1991  Cantoni et al. ............... 370/94.1
5,457,684  10/1995  Bharucha et al. .............. 370/60.1
5,515,386  5/1996  Takizawa et al. ............... 370/60

FOREIGN PATENT DOCUMENTS

4-362825  12/1992  Japan .

Primary Examiner—Douglas W. Olms
Assistant Examiner—Ajit Patel
Attorney, Agent, or Firm—Helfgott & Karas, P.C.

[57] ABSTRACT

A packet data is formed of a plurality of ATM cells. When cells of the packet data are lost, especially if the packet data is an image or picture signal including synchronous signals, it becomes difficult to reproduce the image or picture on a receiving terminal. A data length compensating device compensates the lost cell. In order to deal with the lost cells lying over between two packets, a data length compensating device includes a lost cell detecting circuit which detects a lost cell to be included in the data according to the sequence number of the plurality of cells, compensation control circuit which outputs compensation information including the number of lost cells to be compensated, and inserting circuit inserts dummy data corresponding to the lost cells to be compensated based on the compensation information.

11 Claims, 10 Drawing Sheets

Two cells of SN=4 and SN=5 are missed

PRIOR ART

DATA LENGTH COMPENSATING DEVICE FOR COMPENSATING LOST CELLS IN PACKET DATA COMPOSED OF A PLURALITY OF CELLS

A BACKGROUND OF THE INVENTION

1. Field of the Invention

The present invention relates to a data length compensating device for compensating lost cells, when receiving packet data composed of a plurality of cells. More particularly, it relates to a data length compensating device to overcome some drawbacks, when ATM cells are lost in ATM data including a plurality of cells per a packet.

2. Description of the Related Art

With the spread and extension of multi-media transmission, ATM, i.e., Asynchronous Transfer Mode, is employed as one of the transfer modes of Broadband ISDN (B-ISDN), in recent years. The transfer mode means a method for multiplexing, transmitting and exchanging information signal, such as image, sound, and character data, within a narrow frequency band to a broad frequency band.

In ATM, a digital signal information is divided into a plurality of fixed length blocks, each of which is so called a cell. More particularly, user data, i.e., digital signals, are made into cells, and are transmitted.

Figure 1:
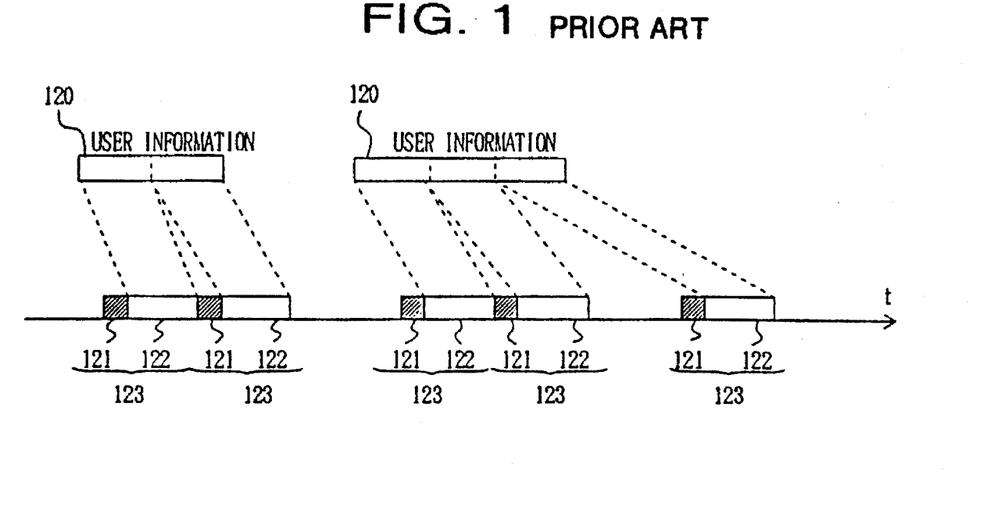
FIG. 1 is a modeling diagram of data transmission system for ATM cells.

Referring now to FIG. 1, the user data will be further described. In FIG. 1, user data 120 of digital signals, which are bursted, are divided into a plurality of fixed length data field 122. A header 121 is added to each of the fixed length data fields 122 to form an ATM cell 123.

Additionally, a length of one ATM cell 123 is, for example, 53 bytes in total, of which 48 bytes are employed as a data field 122 and 5 bytes are employed as an ATM header 121. The header 121 of the 5 bytes contains an address data, etc. The ATM cell 123 is transmitted as a unit in a network.

Figure 2:
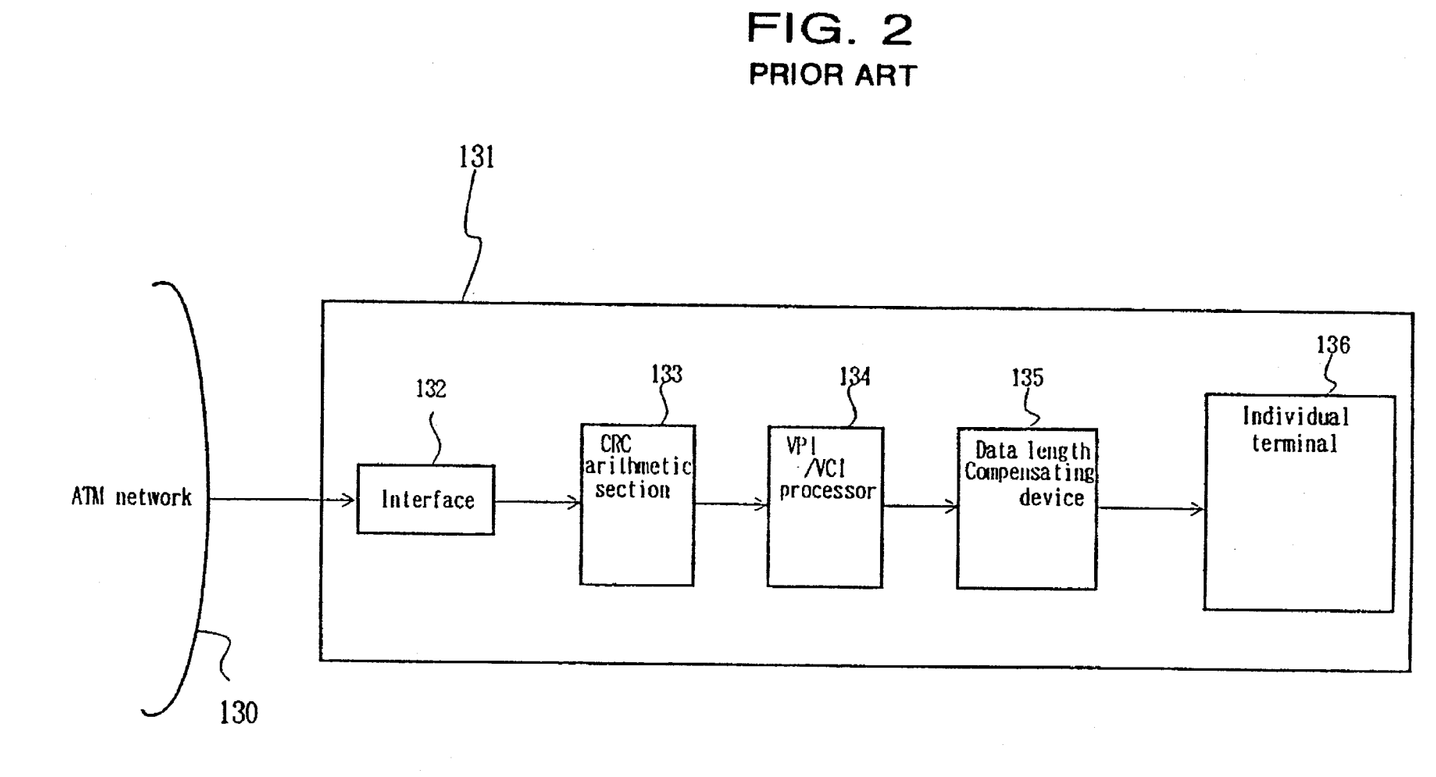
FIG. 2 shows a structural diagram of receiving terminal for explaining a flow of ATM cells.

Referring to FIG. 2, a diagram explaining a general flow of the ATM cell 123 from an ATM network to a terminal, which is a receiver. In FIG. 2, reference numerals 130 and 131 are an ATM network and an ATM receiving terminal. The ATM cell 123 transmitted from the ATM network 130 to the ATM receiving terminal 131 is an optical signal.

In the ATM receiving terminal 131, an interface circuit 132 converts the ATM cell 123, which is the optical signal, to an electrical signal. Additionally, the circuit 132 performs ATM termination alarm processing. The ATM cell 123 converted to the electrical signal is inputted to a CRC arithmetic section 133. The section 133 calculates error correction symbols to correct symbol errors.

Further, the ATM cell 123, of which symbol errors are VPI/VCI processor 134 identifies each of the individual terminals, which receives the cell data, based on a virtual identifier VPI and the virtual channel identifier VCI. Then, the cells are sent to an individual terminal, such as an identified telephone. In FIG. 2, cells are sent to one of the individual terminals 136.

Additionally, in FIG. 2, in the case where an ATM cell is lost during transmission, which is described later, the data length compensating device 135 in the ATM receiving terminal 131 detects the lost ATM cell, and inserts dummy data for the lost cell to compensate the data length of a packet.

Then, the ATM cell, to which dummy data is inserted, to compensate the data length, is inputted the above-described individual terminal 136 to perform processing in peculiar to terminals.

Figure 3A:
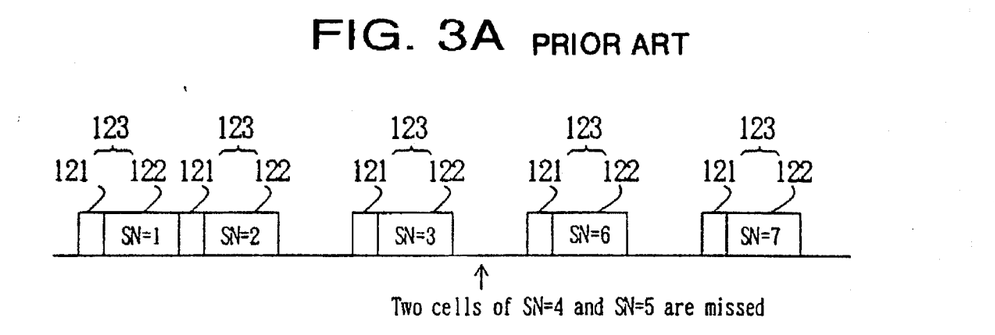
FIGS. 3A and 3B are diagrams for illustrating a conventional system for compensating data length.
Figure 3B:
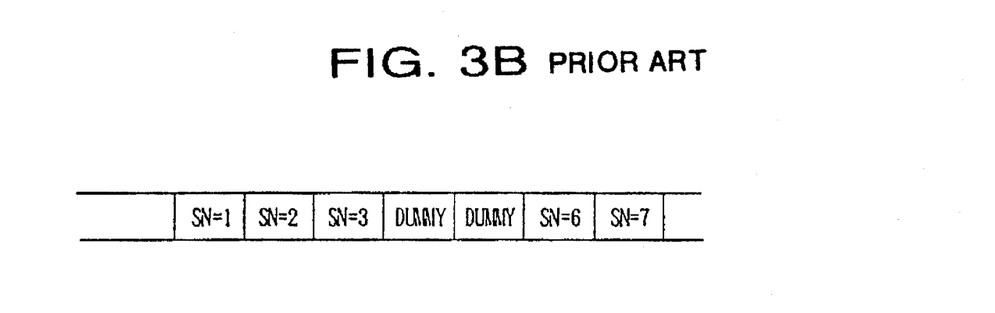

FIGS. 3A and 3B show a diagram for explaining operations of compensating lost cells, which are performed in the data length compensating device 135 in the receiving terminal 131, as shown in FIG. 2. FIG. 3A is an ATM cell sequence under sending data. A plurality of ATM cells 123 appear like a burst. Each of ATM cells 123 includes a header 121 and user data 122.

SN=1 to SN=7, each of which is attached to each of the user data 122, are sequence numbers of the cells. Each of the sequence numbers SN identifies the order of sent ATM cells. In FIG. 3A, the condition of losing two ATM cells, i.e., SN=4 and SN=5, is shown.

Now, when the receiving terminal 131 decodes data with the condition of losing the ATM cells, decoded data becomes shorter as the data lost ATM cells. If the data includes synchronous signals, such as image data, loss of synchronization is generated when recovered in the receiving terminal 131, because of lost cells.

Accordingly, a sequence number SN field is provided in the user data 122, and continuous sequence numbers SN are provided to the user data, as described above, to solve the inconvenience. In the receiving terminal 131, when there are discontinuous sequence numbers SN of the received ATM cells, the terminal 131 can recognize the number of the lost cells.

In the data length compensating device 135 in the receiving terminal 131, original data length can be restored by inserting dummy data, for example, all "zero", of which length is the same as that of data of the lost cell into the lost field, as shown in FIG. 3B. Therefore, it becomes possible to prevent from being out in phase, even if user data field 122 including synchronous signals is lost.

When inserting the dummy data, a buffer is required to temporally store the data while actually detecting lost cells, inserting the dummy data, and receiving some of leading data cells. Accordingly, the present inventors has proposed an idea, which can reduce the capacity of a buffer memory (Japanese Patent Examination No. Tokkai Hei 4-362825).

Figure 4:
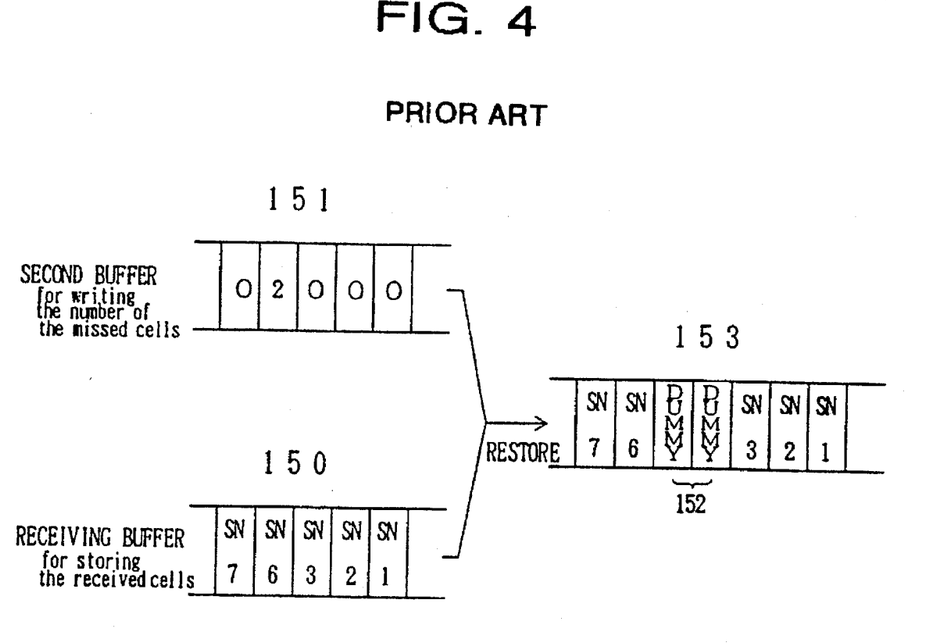
FIG. 4 shows an example for compensating data length by the use of the conventional system, which the present inventor has proposed.

In the proposed idea, as shown in FIG. 4, a receiving buffer 150 and a second buffer 151 are provided for storing the received cells and for detecting the lost cells to write the number of the lost cells, respectively. Further, every time the cells are received, the received cells are written in the receiving buffer 150, and together, the number of cells, which are lost between the previously received cell and the presently received cell, is written in the second buffer 151 as the number of the lost cells.

Consequently, when reading the cells out from the receiving buffer 150, dummy data 152 is inserted into the number of lost cells written in the second buffer 151 to restore the data length before the cells are lost (refer to 153 of FIG. 4).

However, there are some case where cell data is piled per a packet unit and the packet unit is sent in ATM network 130. In this case, more particularly, when the cells are lost with lying over a bound of packets, i.e., two packets, it becomes impossible to restore a correct packet length, because data indicating the length of an original packet is not included, even by the above-described idea, which the present inventors have proposed.

SUMMARY OF THE INVENTION

Accordingly, it is an object of the present invention to provide a data length compensating device, which can restore an original packet length for the cell losing, when the data are formed as ATM cells.

It is another object of the present invention to provide a data length compensating device, which can restore the original packet length for the lost cells lied over two packets.

A data length compensating device according to the present invention, which deals with the lost cells lying between over two packets.

The device comprises an input terminal inputted packets each having a plurality of cells, a data writing control means for receiving the packets from the input terminal and outputs cell data, a data buffer memory for holding the cell data sent from the data writing control means, a lost cell detecting means for receiving the packets sent from the input terminal and detects the lost cells in the packets, a compensation control means for judging a lost cell mode based on information of the number of lost cells sent from the lost cell detecting means, and determining the number of cells to be compensated and positions of compensation in correspondence with the judged lost cell mode, and an inserting means for inserting dummy data to the cell data sent from the data buffer memory, based on the number of cells to be compensated and the positions of compensation outputted from the control buffer memory. Accordingly, the data length before losing cells of the packet can be restored.

Further, objects of the present invention become clearly by the description of embodiments, accompanied with the attached drawings.

DESCRIPTION OF THE PREFERRED EMBODIMENTS

Throughout the following descriptions, the same reference numerals are used to denote and identify corresponding or identical components.

Figure 5:
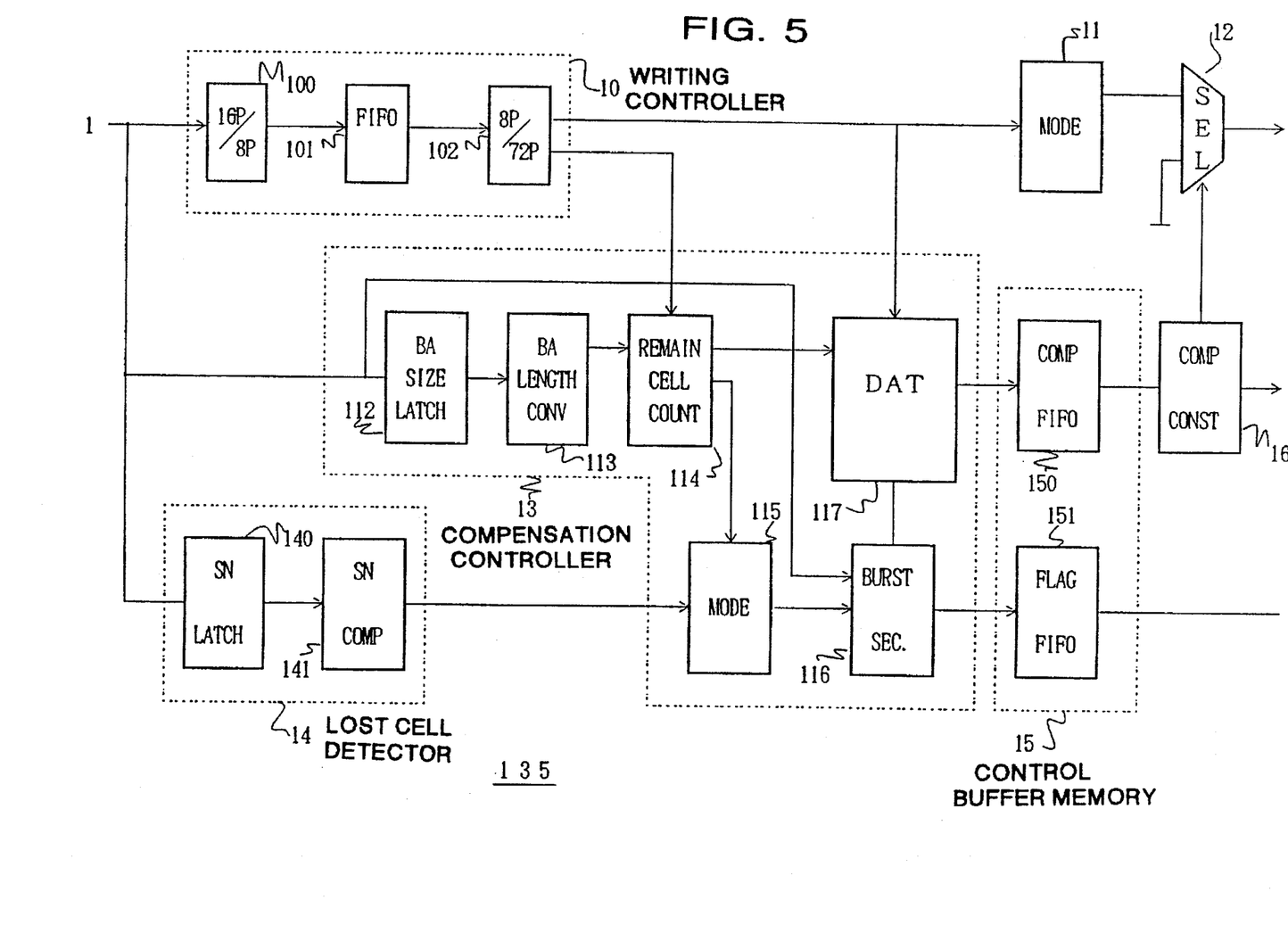
FIG. 5 is a structural block diagram of a data length compensating device according to the present invention.

FIG. 5 shows a structural block diagram of a data length compensating device according to the present invention, corresponding to the data length compensating device 135 in the ATM receiving terminal 131, which is explained in FIG. 2.

In FIG. 5, an ATM cell series in a packet form sent from a VPI/VCI processor 134 is inputted to a terminal 1 of the data length compensating device 135. The data length compensating device 135 is formed of a writing controller 10, a data buffer 11, a packet assembling section 12, a compensation controller 13, a lost cell detector 14, a control buffer memory 15 and dummy generation controller 16. The explanation of structure and function of each section will be explained later.

For better understanding of the present invention, a structural example when making data into cells with the form of packets at a sending terminal, which is premised on the present invention, will be now explained in accompany with FIGS. 6A to 6E.

The examples shown in FIGS. 6A to 6E show a format of type 4 of AAL-CS (ATM Adaptive Layer Convergence Sublayer) and a format of type 4 of AAL-SAR (ATM Adaptive Layer Segment And Reassembly).

Figure 6A:
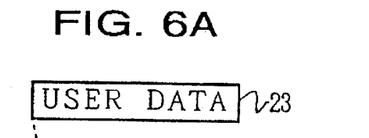
FIGS. 6A to 6E are structural examples of CS SAR format, which is prescribed as type 4 of an ATM adaption layer.
Figure 6B:
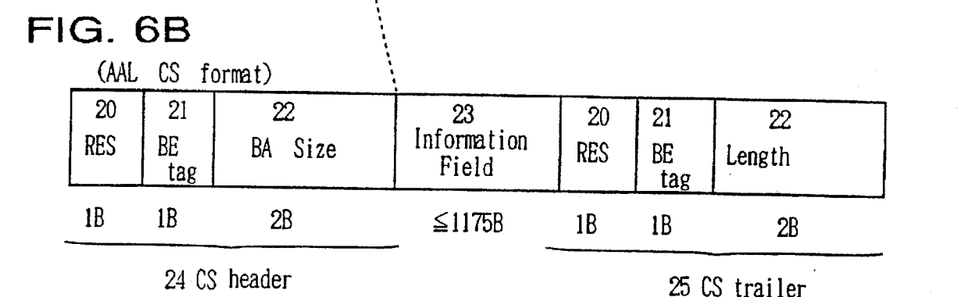
Figure 6C:
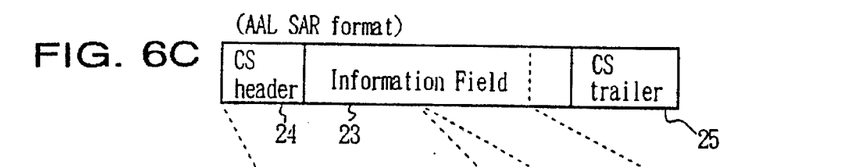

FIG. 6A shows a user data 23. The user data 23, of which size is less than 1175 bytes, is generated from a user terminal. As shown in FIG. 6B, CS (Convergence Sublayer) header 24 and CS trailer 25 of the AAL-CS format are added to the user data. The AAL-SAR format is formed as shown in FIG. 6C.

In FIG. 6B, the added CS header 24 includes a protection field RES 20, of which all bits are set to "zero" with 1 byte length, a BE tag 21, which is a starting tag, of which all bits are set to "zero" with 1 byte length, and a BA size 22, which shows the size of a burst with 2 bytes length.

The CS trailer 25 includes a protection field RES 20, a BE tag 21, which is a finishing tag, and further a length field 22 formed of two bytes, which shows a length of a burst.

Further in FIG. 6B, the user data, of which size is less than 1157 bytes, as shown in FIG. 6A, is stored in an information field 23.

As shown in FIG. 6C, the AAL-SAR format formed of the CS header 24, an information field 23 and a CS trailer 25, is delimited in 44 bytes unit. Then, information of two bytes is respectively added to the leading unit of 44 bytes and the heading unit of 44 bytes. Therefore, the format is composed of 48 bytes, as shown in FIG. 6D.

The structure of 48 bytes becomes a user information data 122, which is explained in FIG. 1. Further, as shown in FIG. 6E, an ATM header 121 of the 5 bytes is added to the user information data 122.

Figure 6D:
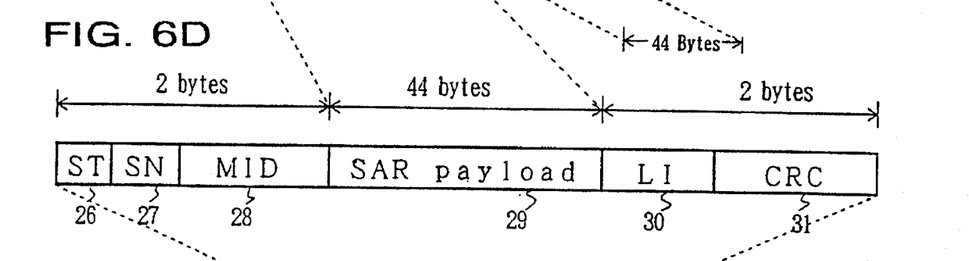
Figure 6E:
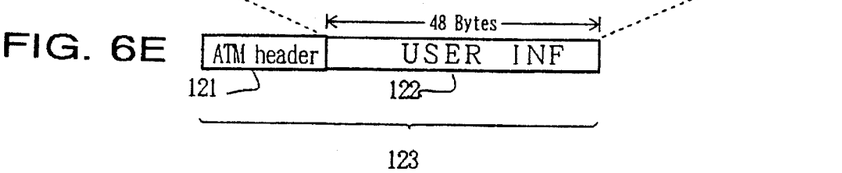

In this example, a heading start field ST 26, which is formed of the heading 2 bits in the header of 2 bytes included in the user information data 122 shown in FIGS. 6D and 6E, shows a segment type of the cell. The contents of the heading start field ST 26 will be expressed as follows.

BOM (Beginning of Message): "1, 0"
COM (Continuance of Message): "0, 0"
EOM (End of Message): "0, 1"
SSM (Single Segment Message): "1, 1"

Further, two bits of field SN 27 following the starting field ST 26 show a sequence number. Order numbers 0 to 15 defined by the field SN 27 are added to all of the cells in the same VCI. The remain field MID 28 shows a message identifier for identifying data cells and control cells. The field MID 28 identifies data cells and control cells, to which a burst data cell belongs, and cells are defined with the following relation.

Control Cell: 0

Data Cell: ascending number of 1 to 255

SAR payload 29 having 44 bytes is delimited and stored in a unit of 44 bytes, as tied the content of the AAL SAR format shown in FIG. 6C with dotted lines between FIGS. 6C and 6D.

Further, the leading field LI 30, which is included in the user information data 122, shows the length of the SAR payload 29. The CRC 31 is a parity check field. A polynomial expression for generation $x^{10}+x^9+x^5+x^4+x+1$ is calculated based on the bit data of all fields of the ATM cell other than the CRC field 31. Therefore, the value of polynomial expression for generation, which is employed for error correction, is set in the CRC arithmetic section 133 explained in FIG. 2.

A structure and operation of the data length compensating device 135 according to the present invention, when a packet is formed by ATM cells, which are described above, are received via the ATM network 130, will be explained by giving some examples of contents of each received data.

In FIG. 5, the ATM cell 123 of a packet form is received and inputted from the VPI/VCI processor 134 to the input terminal 1.

The received ATM cell 123 is further inputted to the writing controller 10, a compensation controller 13 and the lost cell detector 14.

The writing controller 10 has a function for converting the speed for the cell data of the SAR-payload 29 in the ATM cell 123 and a function for buffering the ATM cell 123. A 16P/8P convertor 100 in the writing controller 10 receives the cell data of the SAR-payload 29 as the parallel signals of 16 bits and converts the signals to the parallel signals of 8 bits.

The cell data, which is converted to the parallel signal of 8 bits, is inputted to a FIFO (First-In-First-Out) memory 101 and buffered.

Further, the data outputted from the FIFO memory 101 is inputted to the 8P/72P convertor 102 to convert to the parallel signal of 72 bits and input it to the data buffer 11 formed of a FIFO memory. Further, buffering is performed for converting the speed of the signal in the data buffer 11.

In this way, the speed conversion in the writing controller 10 is performed to pace with the high speed for processing in the internal circuits.

The cell data read from the data buffer 11 is inputted to the packet assembling section 12, which is formed of a selector.

Further, the packet formed with ATM cells, which is inputted to the terminal 1, is inputted to the BA size latch circuit 112 in the compensation controller 13. Then, the heading cell in the first packet is received, and the BA (burst) size 22 in the CS header 24, which is explained in FIG. 6B, is latched.

Figure 7:
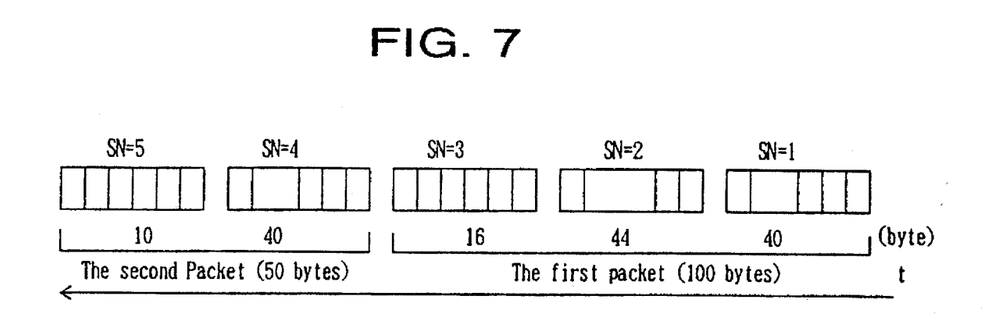
FIG. 7 shows an example of a condition of received packets, of which cells are not lost.

Referring now to FIG. 7, an example of condition of the received packet, when no cell is lost, is shown. Shown is an example where two packets composed of 5 cells are received, the first packet of which has the packet length of 100 bytes and the second packet of which has the packet length of 50 bytes respectively of the cell data in the SAR payload 29 of the ATM cell 123.

Accordingly, the BA size latch circuit 112 latches BA size =100 bytes as the first packet size from the BA (burst) size 22 of the CS header 24 included in the heading cell of the first packet.

The latched data of BA size=100 bytes is inputted to the BA length convertor 113. BA length convertor 113 has a function for converting the BA size 22 in the CS header 24 to the burst length. More particularly, the BA length convertor 113 is composed of a ROM for storing the correspondence with the BA size and the burst length to read the corresponding burst length from the inputted BA size.

In the example of FIG. 7, the first packet of 100 bytes is converted to each of the bursts or cells of 40 bytes, 44 bytes and 16 bytes. In each packet, only the heading section is the burst length of 40 bytes. The leading cell is composed of 44 bytes. This is because the SAR payload 29 is 44 bytes as shown in FIG. 6D.

The data of burst length read from the BA length convertor 113 is set to the remain cell counter 114. The remain cell counter 114 is formed of a subtraction counter. Then, every time data is transferred and written from the writing controller 10 to the data buffer 11, data is subtracted from the subtraction counter of the remain cell counter 114 and the number of remain cells (=burst size−number of written byte) is shown in the subtraction counter.

Meanwhile, the lost cell detector 14 refers the SN number of SN field 27 selected from the heading data of 2 bytes in the user information data 122, as explained in FIG. 6D, and detects the difference between the numbers of the previously received and the presently received cells. Therefore, the lost cell detector 14 is composed of a SN number latch circuit 140 and a comparison circuit 141 having a buffer function.

A SN number is latched in the SN number latch circuit 140, and the SN number latched is compared with the SN number, which has been previously received to output difference. The difference between the previously received and the presently received cell numbers are inputted to the mode detector 115 in the compensation controller 13 as a compensation data.

When there is no lost cell, the leading and following SN numbers are continued. In the example of FIG. 7, as there is no lost cell, the comparison circuit 141 detects continuation of the SN numbers and inputs the compensation data "zero" to the mode detector 115.

Returning to the explanation of the compensation controller 13, the controller 13 having compensation number determining section 117, receives remaining byte data from the remain cell counter 114 and decides the number of compensation cells as described later. Further, the mode detector 115, the function of which is also described later, is formed of a ROM. The mode detector 115 calculates based on the output from the comparison circuit 141 in the lost cell detector 14, detects and outputs the mode of the lost cells, such as the condition of the lost cells, which are some cells within a packet, which are all cells of a packets, or which are cells lying between two packets.

Further, the burst delimitation determining detector 116 in the compensation controller 13 receives the number of the remain cells from the remain cell counter 114, the mode data of the lost cells from the mode detector 115. Further, the mode detector 115 notifies the mode data of the lost cells, i.e., in what condition of the packet the cells are lost, that is, the cells are lost in the middle of a packet, head of a packet, or lying over two packets.

Furthermore, burst delimitation determining detector 116 detects the starting point of the packet, synchronizing with writing the data of the head data of the above-described packet to the data buffer memory 11, writes BOP=1, which is a starting flag indicating the starting point of the packet to the flag memory 151 of the control buffer section 15.

Meanwhile, every time the writing controller 10 writes data to the data buffer memory 11, the 8P/72P convertor 102 in the writing controller 10 inputs a trigger signal to the remain cell counter 114.

Then, the number of the latched bytes is subtracted, which are counted in the remain cell counter 114 by the trigger signal. The counting value in the remain cell counter 114 in that time is inputted to the compensation number determining section 117.

The compensation number determining section 117 recognizes that the number of remain bytes in the first packet shown in FIG. 3 is found by the expression of 100−40=60, according to the number of bytes "100" in the first packet sent from the burst delimitation determining detector 116, the number of bytes of the burst length SN=1, which is sent from the remain cell counter 114 and the number of bytes "40" written to the data buffer memory 11.

When receiving the cell of SN=2, the writing controller 10 writes the data section, i.e., the 41st to 84th bytes, to the data buffer memory 11, similarly. Then, the value of the remain cell counter 114 in the compensation controller 13 becomes 84.

When further receiving the cell of SN=3, i.e., the last cell in the first packet, the writing controller 10 similarly writes the data section, i.e., the 85th to 100th bytes, to the data buffer memory 11. Simultaneously, the burst delimitation detector 116 in the compensation controller 13 detects the end of the packet, and writes EOP=1, which is the last flag of the packet, to the buffer memory 151 in the control buffer section 15.

When writing the last bytes to the data buffer memory 11, the writing controller 10 clears and resets the remain cell counter 114 in the compensation controller 13.

Figure 8A:
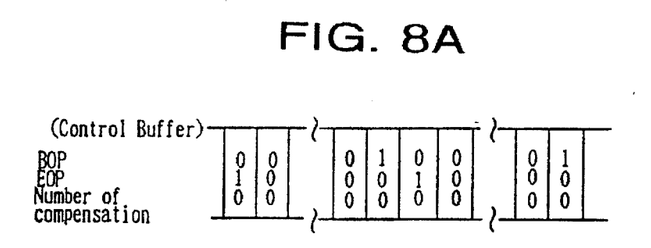
FIGS. 8A to 8C show a condition of a control buffer memory corresponding to the condition of the received packets shown in FIG. 7.
Figure 8B:
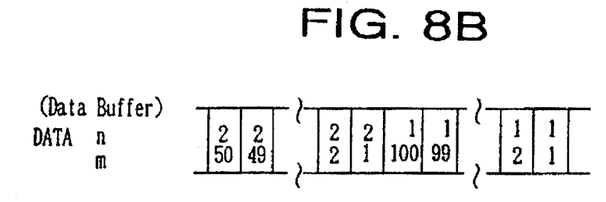
Figure 8C:
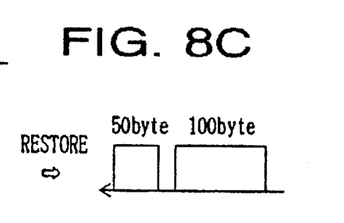

Then, the second packet, which is formed of 50 bytes, is performed the same processing as described above. Referring now to FIG. 8, a diagram shows a condition of the buffer controller 15 composed of the buffer memory 150 for storing the number of compensation cells and the buffer memory 151 for storing the position of compensation cells, which is corresponding to the lost mode of received cells as shown in FIG. 7, and a condition of the data buffer memory 11.

FIG. 8A shows the conditions of the buffer memory 150 for storing the number of compensation cells in the buffer controller 15 and the buffer memory 151 for storing start and end flags (BOP/EOP). In FIG. 8A, "1" is set to the position of BOP of the buffer memory 151 in the upper portion, and "1" is set to the position of EOP in the buffer memory 151 in the middle portion. Further, the number of compensation cells, which is stored in the buffer memory 150, is shown in the bottom portion. In FIG. 8A, all of the number of compensation cells corresponding to the example shown in FIG. 7, are zero, because there is no lost cell.

FIG. 8B shows contents of the data buffer memory 11. A figure n in the upper portion shows the nth packet, and a figure m in the bottom portion shows data of the mth bytes. Returning to FIG. 5, data sent from the data buffer memory 11 is inputted to the packet assembling section 12 that is a selector formed of, for example, a tri-state buffer. One of the input terminals of the packet assembling section 12 is grounded. When a dummy data control signal from a dummy generation controller 16 enters, the grounded potential is selected and outputted, while other input terminal, i.e, an output sent from the data buffer memory 11, is selected and outputted, when there is no dummy data control signal given by the dummy generation controller 16.

A signal of instructing the number of compensation cells sent from the buffer memory 150 for storing the number of compensation cells in the control buffer 15 is inputted to the dummy generation controller 16. The dummy generation controller 16 inputs dummy data control signals of the number of clocks corresponding to the number of compensation cells to the packet assembling section 12. The value of zero is sent to the packet assembling section 12, in correspondence to the number of compensations cells, inserts the original data position in order to restore the data length as the length before losing cells.

However, as there is no lost cell in the example of FIG. 7, the dummy data control signal sent from the dummy generation controller 16 cannot be outputted. Therefore, the value of zero, which is a dummy data sent from the selector 12, cannot be outputted, and only data read from the data buffer 11 is outputted.

Figure 9:
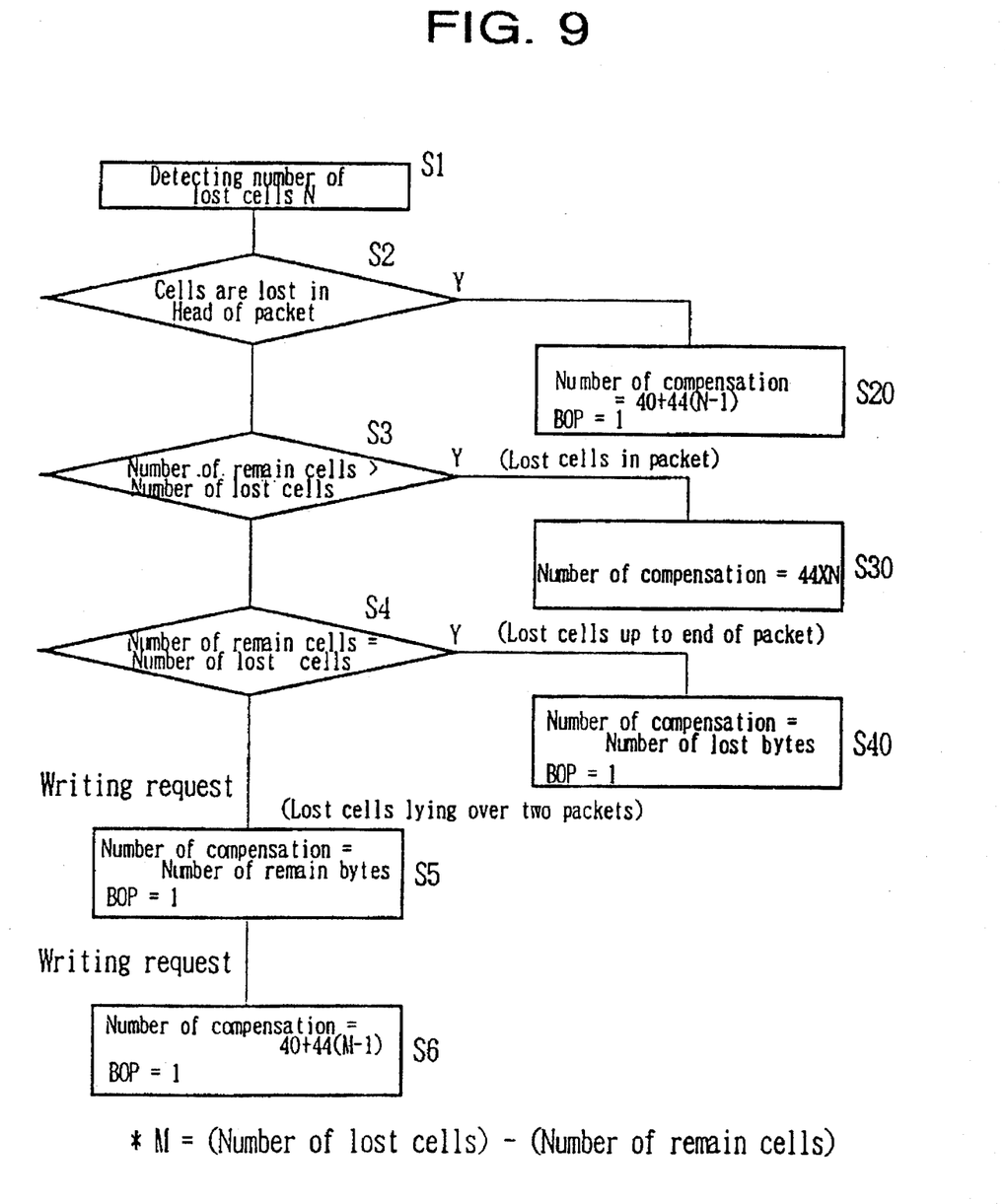
FIG. 9 is a flow chart of processing of the data length compensating device according to the present invention.

Before explaining based on the example of the received packet data when the cells are lost, the operation of the data length compensating device 135 in the embodiment shown in FIG. 5, which has been explained based on the example of condition of the received packet data shown in FIG. 7, will be explained according to the operational flow chart of the device employing the present invention, which is shown in FIG. 9.

When the received packets are inputted, the lost cell detector 14 finds the difference between a new cell number and an old cell number to notify to the compensation controller 13. The mode detector 115 detects the number of the lost cells N and outputs the corresponding mode of the lost cells (STEP S1).

The burst delimitation controller 116 in the compensation controller 13 recognizes whether or not the lost cells are positioned in the heading of the packet according to the mode of lost cells (STEP S2).

When a lost cell is positioned from the header of the packet, in the compensation controller 13, the burst delimitation detector 116 and the compensation number determining section 117 send the compensation data, i.e., the position of the lost cell, and more particularly, in this case, BOP=1 and the compensation cells for the number N of the lost cells, that is, [=40+44 (N−1)], to the buffer controller 15 (STEP S20). The number of compensation cells is set to the buffer memory 150 in the buffer controller 15, and the position of the lost cells is set to the buffer memory 151.

When the lost cell is not positioned in the header of the packet, the mode detector 115 in the compensation controller 13 compares and judges whether or not the number of the remain cells is larger than the number of the lost cells. When the number of remain cells is larger than the number of the lost cells, it is judged that the cells in the packet are lost. Then, the signal showing the mode of the lost cells is sent to the burst delimitation detector 116 (STEP S3).

In the compensation controller 13, the burst delimitation detector 116 and the compensation number determining section 117 send the compensation data, i.e., the positions of the lost cell and the number of compensation bytes for the number N of the lost cells, that is, =44×N, to the buffer controller 15, as a writing request (STEP S30). The number of compensation bytes is set to the buffer memory 150 in the buffer controller 15, and the position of the lost cells is set to the buffer memory 151 in the controller 15.

When the lost mode detector 115 in the compensation controller 13 judges that the number of remain cells is equal to the number of the lost cells (STEP S4), and more particularly, when the cells are lost up to the last cell in the packet, the compensation controller 13 sends the compensation data, i.e., the number of compensation bytes for the number N of the lost cells (=the number of remain bytes) and the corresponding position of the lost cells, to the control buffer 15, as a writing request (STEP S40). Writing is performed to the buffer memories 150 and 151, based on the compensation data.

On the above described step S4, when the number of the remain cells is not equal to that of the lost cells, and the number of remain cells is larger than that of the lost cells, the compensation controller 13 judges that the lost cells are lying over two packets. Then, the compensation controller 13 sends the compensation data, i.e., the number of compensations (=the number of remain bytes) and EOP=1, as a writing request. Therefore, the number of compensation bytes is written to the position corresponding to the last cell in the first packet (STEP S5).

Further, the compensation controller 13 calculates the expression of M=(the number of the lost cells–the number of the remain cells). The found number of compensation bytes= 40+44 (M−1) and BOP=1 are sent to the buffer controller 15 as compensation data. Writing to the buffer memories 150 and 151 is performed according to the number and the position of compensation cells for the second packet, based on the compensation data.

The above-described processing step can be explained in order as follows. The compensation number determining section 117 counts the number of bytes written in the data buffer memory 11 per a packet. When the BA size (burst size) latch circuit 112 receives the cells in the packet, the circuit 112 extracts the header cell from the BA size (burst size) in the CS header and hold the value.

The lost cell detector 14 monitors the sequence number. When the detector 14 detects the lost cells, the compensation controller 13 counts the written number of the bytes. Simultaneously, the compensation controller 13 compares the number with the BA size (burst size) and finds the number of the remain unreceived cells in the packet while receiving (=burst size–the written number of the bytes).

When the number of the lost cells is larger than the number of the remain cells, it can be recognized that the lost cell is a cell in the next packet. Accordingly, the dummy data length, which is added to the end of the packet, and the dummy data length, which is added to the head of the next packet, can be found by the expressions. Further, the original packet length can be respectively restored.

Figure 10:
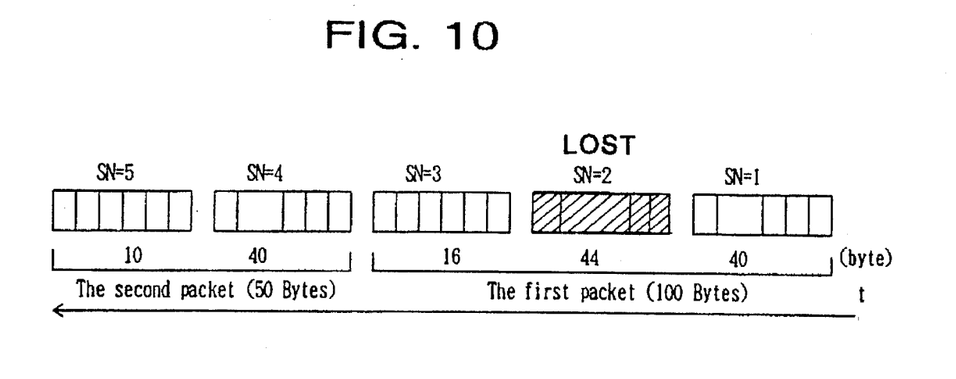
FIG. 10 shows an example of a condition of the received packets, when same cells of the packets are lost.

FIG. 10 shows a condition of the received data in the case where a cell is lost in a packet. In the example shown in FIG. 10, the second cell, i.e., SN=2, in the first packet is lost.

In this case, the BA size latch circuit 112 in the compensation controller 13 recognizes that the first packet is formed of 100 bytes by receiving the head cell in the first packet at first and extracting BA size=100.

The writing controller 10 writes the data section, i.e., the 1st to the 40th bytes, to the data buffer memory 11. Then, the remain cell counter 114 calculates the expression for finding the number of remain cells [=burst size (100) the written number of bytes (40)] according to the number of bytes, i.e., "40", written to the data buffer memory 11. Therefore, the counter 114 detects that the number of the remain bytes in the first packet is 60 bytes.

When receiving the third cell, i.e., SN=3, in the first packet, the lost cell detector 14 detects one lost cell, and notifies the number of the lost cells to the compensation controller 13. Since the maximum number of bytes 44, which is lost by one lost cell, that is, the number of remain byte in the packet notified from the remain cell counter 114, is 60, the compensation number determining section 117 in the compensation controller 13 decides that dummy data of 44 bytes may be inserted between the data of the third cell SN=3 and the former data, i.e., data of the end byte of SN=1.

Accordingly, the compensation number determining section 117 in the compensation controller 13 sends and writes the data of the number of compensation bytes 44 to the buffer memory 150 for storing the number of compensation bytes in the buffer controller 15. After that, the writing controller 10 writes data, i.e., the 85th to 100th bytes, to the data buffer memory 11. Simultaneously, the burst delimitation detector 116 writes EOP (End of Packet flag)=1 to the flag memory 151 of the buffer controller 15. After that, the remain cells are processed as well as explained in FIGS. 7 and 8.

Figure 11A:
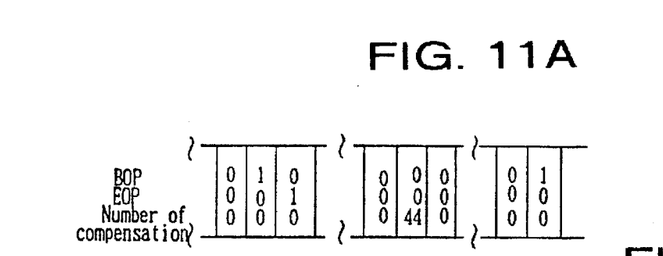
FIGS. 11A to 11C show a condition of the buffer memory corresponding to the condition of the received packets shown in FIG. 10.
Figure 11B:
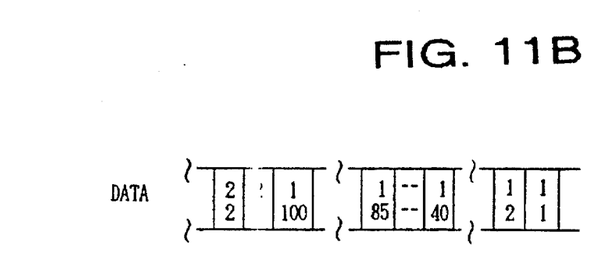

FIGS. 11A and 11B show conditions of buffer controller 15 corresponding to the condition of the received packets shown in FIG. 10. In FIG. 11A, the number of compensation bytes 44 in the buffer memory 150 for storing the number of compensation bytes in the buffer controller 15 is corresponding to the lost cell between 40 bytes and 85 bytes in the first packet having the condition of the data buffer memory 11 shown in FIG. 11B.

Figure 11C:
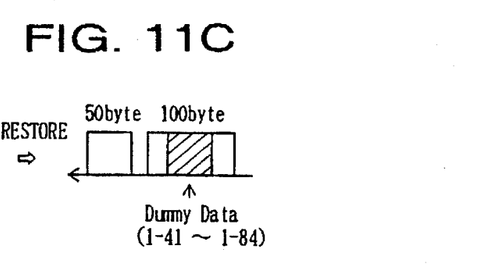

For the condition of the buffer memory 150, the dummy generation controller 16 controls the packet assembling section, or selector 12 to insert dummy data corresponding to 44 bytes as compensation bytes, to the position of the lost cell, which position is instructed by the flag memory 151, and restores the data length as the same as the length before losing the cell, as shown in FIG. 11C.

Figure 12:
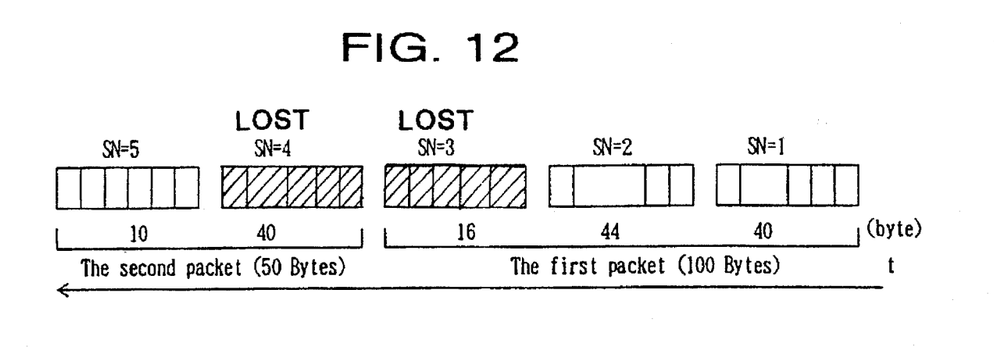
FIG. 12 shows an example of a condition of the received packets, when cells including the last cell in a packet is lost.

FIG. 12 shows a condition of the received packet data in the case where the cells including the last cell of the packet are lost. The example shows the case where the third cell, i.e., SN=3, of the first packet and the first cell, i.e., SN=4, of the second packet are lost.

In this case, the BA size latch circuit 112 of the compensation controller 13 recognizes that the first packet is formed of 100 bytes by receiving the head cell of the first packet, and extracting BA size 100.

The writing controller 10 writes the data section of the packet (the first to 40th bytes) to the data buffer memory 11. Further, the remain cell counter 114 calculates the number of bytes for remain cells [=burst size (100)–the written number of bytes (40)], based on the written number of bytes "40" in the data buffer memory 11. Therefore, the counter 114 detects that the number of remain bytes in the first packet is 60.

When receiving the next cell SN=2, the data section, i.e., the 41st to 84th bytes, is written to the data buffer memory 11 in the same way. Then, the above-described calculation is performed based on the written number of bytes 84, the remain cell counter 114 detects that the number of remain bytes in the first packet is 16 bytes.

Since the third cell SN=3 in the first packet and the first cell SN=4 of the second packet are lost, the second cell SN=5 in the second packet is next received. Then, the lost cell detector 14 detects two lost cells and notifies the number of the lost cells "2" to the lost mode detector 115 in the compensation controller 13.

In the lost mode detector 115 of the compensation controller 13, the number of the maximum bytes lost by the two lost cells is 88, and the number of the remain bytes of the packet is 16. Therefore, the detector 115 judges that it is the lost cell includes the last cell of the first packet. Further, the burst delimitation detector 116 receives the lost cell mode data from the lost mode detector 115, and finds the number of cells "1", which is required for transferring the remain bytes 16. The finding of the number of cells required for transferring remain bytes is performed by employing, for example, a table ROM, and the number of cells required is notified to the compensation number determining section 117.

Further, the mode detector 115 detects that the other cell is the head cell of the next packet because the number of remain cells is "2". Therefore, it is easy understood that other cell is the head cell of the next packet. When the burst delimitation detector 116 receives the data from the mode detector 115, the section 116 writes EOP=1 to the flag buffer memory 151. Simultaneously, the compensation number determining section 117 writes the number of compensation bytes 16 to the buffer memory 150 for storing the number of compensation bytes.

Then, each of the burst delimitation detector 116 and the compensation number determining section 117 writes BOP=1 and the number of compensation bytes 40 to the buffer memory 151 for storing the compensation position and the buffer memory 150 for storing the number of compensation bytes, respectively. After that, the writing controller 10 writes the data of cells, i.e., the 40th to 50th bytes in the second packet to the data buffer memory 11.

Figure 13A:
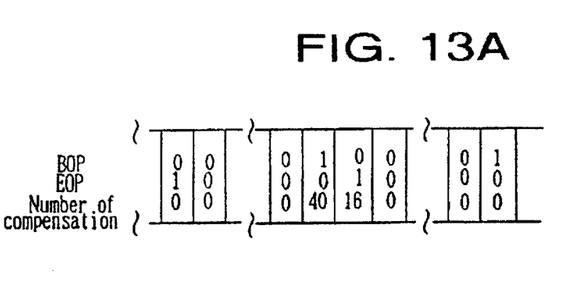
FIGS. 13A to 13C show a condition of the buffer memory corresponding to the condition of the received packets shown in FIG. 12.
Figure 13B:
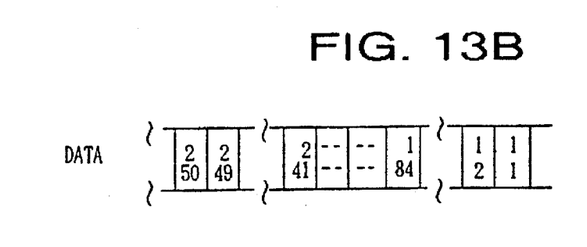

FIGS. 13A and 13B show a diagram showing the condition of the buffer controller 15 corresponding to the condition of the received packets shown in FIG. 12. As shown in FIG. 13A, the number of 16 bytes is recorded on the position of the cells corresponding to the flag EOP=1, which is set in the memory 151 by the burst delimitation determining detector 116, and the number of 40 bytes is recorded on the position corresponding to the flag of BOP=1, to the buffer memory 150 for storing the number of compensation bytes in the buffer controller 15.

Figure 13C:
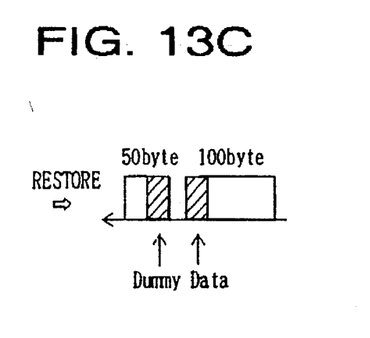

Then, the dummy generation controller 16 outputs control signals corresponding to the number of compensation bytes stored in the buffer memory 150 for the position of compensation set on the flag memory 151, to the packet assembling section 12. Therefore, as shown in FIG. 13C, dummy data are inserted to the position of the last cell of the first packet and the position of the head cell of the second packet, and then the original data length before losing cells can be restored.

Figure 14:
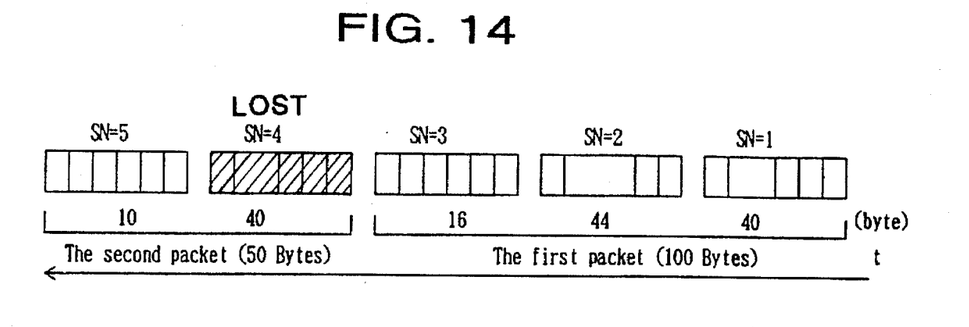
FIG. 14 shows an example of a condition of the received packets, when the cell is lost from the head of a packet.

FIG. 14 shows a condition of the received packet data in the case where a cell is lost from the head of a packet. More particularly, the example shown in FIG. 14 shows the case where the first cell, i.e., SN=4, in the second packet is lost.

In this case, the normal processing is performed, as the same as explained in FIGS. 7 and 8, as there is no lost cell in the first packet. When receiving the cell of SN=5, which is the second cell of the second packet, the lost cell detector 14 detects and notifies the losing of one cell, the lost cell mode detector 115 of the compensation controller 13.

Since one of the head cells is lost, the compensation number determining section 117 reads the number of compensation bytes 40 by a table ROM as explained above, sends the number of compensation data to the buffer memory 150 for storing the number of compensation bytes, and writes the number of compensation bytes 40. Simultaneously, the burst delimitation detector 116 writes BOP=1 to the memory 151. After that, the writing controller writes the 40 to 50 bytes of the second cell in the second packet.

Figure 15A:
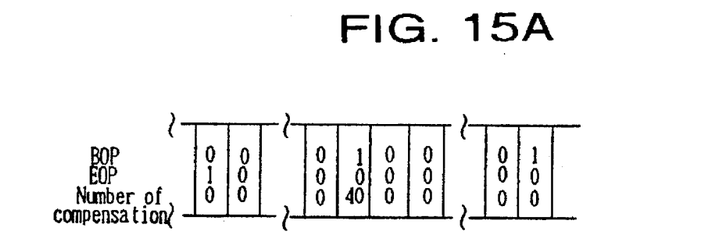
FIGS. 15A to 15C show a condition of the buffer memory corresponding to the condition of the received packets shown in FIG. 14.
Figure 15B:
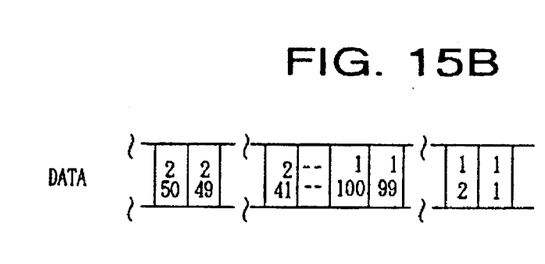
Figure 15C:
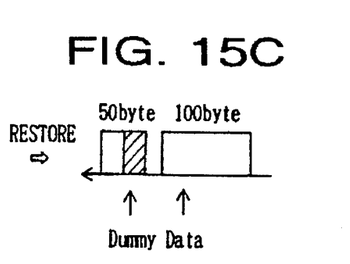

FIGS. 15A and 15B show a condition of the buffer memories 150 and 151 corresponding to the condition of the received packets shown in FIG. 14. In FIG. 15A, as the head cell of the second packet corresponding to BOP=1 set in the flag buffer memory 151 is lost, the number of compensation bytes 40 is specified in the buffer memory 150 for storing the number of compensation bytes. As shown in FIG. 15C, the dummy data is added to the head of the second packet and thus the original data length is restored.

As explained according to the embodiment above, the present invention can realize that the original packet length can be restored by inserting dummy data at a receiving terminal, even if the cells are lost. More particularly, according to the present invention, it becomes possible to insert dummy data length properly by calculations, even if the cells are lost lying over two packets, and to restore the data length before losing the cells.

The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A data length compensating device compensating a length of packet data composed of a plurality of packets, each including a plurality of cells, which have sequence numbers, the data length compensating device comprising:

an input terminal for receiving a plurality of the packets of the packet data;

a first buffer memory for holding a plurality of cells included in the received packets;

lost cell detector for detecting lost cells to be included in the received packets and outputting the number of the lost cells;

compensating controller, operatively connected to the lost cell detecting means, for judging a cell lost mode, which indicates where the lost cells are to be located at the heading of a packet, within a packet or over succeeding packets of the received packet data, based on the number of the lost cells sent from the lost cell detector and deciding positions of the lost cells to be compensated to the received packet data in correspondence with the judged cell lost mode;

a second buffer memory, operatively connected to the compensating controller and the first buffer memory, for storing the decided number of the lost cells and the positions to be compensated; and inserting circuit, operatively connected to the first and second buffer memories, for inserting dummy cells to the plurality of cells output from the first buffer memory, based on the number of the lost cells and the positions to be compensated, output from the second buffer memory to restore the length of the packet data.

2. The data length compensating device according to claim 1, wherein the dummy cells are expressed by "zero" in all.

3. The data length compensating device according to claim 1, wherein the inserting means for inserting the dummy data includes a driftage buffer, to which is inputted cells outfitted from the first buffer memory, and a dummy generation controller, operatively connected to the driftage buffer, for controlling the driftage buffer to pass the cells sent from the first buffer memory, based on the number of the lost cells to be compensated and the positions of the compensation, and prevent cells from passing via the first buffer memory while inserting the dummy data.

4. The data length compensating device according to claim 3, wherein each of the first and second buffer memories is composed of a FIFO (first-in-first-out) memory.

5. The data length compensating device according to claim 3, wherein the data showing the positions of compensation, which are stored in the second buffer memory are flag information of Beginning of Packet (BOP) and End of Packet (EOP).

6. The data length compensating device according to claim 1, wherein the lost cell detecting means monitors continuity of the sequence numbers of the cells and judges the number of the lost cells according to the sequence numbers of the previously received and the presently received cells.

7. The data length compensating device according to claim 6,
wherein each of the plurality of cells is an ATM cell, each of the heading ATM cells includes a CS header having the BA (burst size) showing the number of bytes composed of the packet, and
the compensating control means compares the number of bytes, which is written to the data buffer with the BA size (burst size), finds the number of remain cells, which have not been received in the packet while receiving, and judges that the condition is a cell lost mode, in which the cells lie over two packets, when the number of the lost cells is larger than the remain cells.

8. A data length compensating device for compensating a length of packet data composed of a plurality of packets, each including a plurality of cells, which have sequence numbers, the data length compensating device comprising:
lost cell detector for detecting lost cells to be included in the packet data according to the sequence numbers of the plurality of cells;
compensation controller for judging a cell lost mode, which indicates where the lost cells are to be located at the heading of a packet, within a packet or over succeeding packets of the packet data, based on the number of the lost cells and outputting compensation information including the number and positions of the lost cells to be compensated; and
inserting circuit for inserting dummy cells in the positions of the lost cells based on the compensation information.

9. The data length compensating device according to claim 8,
wherein the dummy cells are expressed by "zero" in all.

10. The data length compensating device according to claim 8,
wherein each of the plurality of cells is an ATM cell, a heading ATM cell of the packet includes a CS header having BA (burst) size showing the number of bytes composed of the packet; and
the compensation controllers compares the received number of bytes with the BA (Burst) size, finds the number of remaining cells of the packet while receiving, and judges that the lost cells in the lost cell mode lie over two packets, when the number of the lost cells is larger than the remain cells, which have not been received.

11. A data length compensating method for compensating a length of packet data composed of a plurality of packets, each including a plurality of cells, comprising the steps of:
receiving the plurality of packets, each including a plurality of cells;
detecting lost cells from the received plurality of packets;
deciding the number of the lost cells;
judging a cell lost mode based on the number of the lost cells;
deciding positions of the lost cells to be compensated in correspondence with the cell lost mode; and
inserting dummy cells to the packet data, based on the number of the cells and the positions to be compensated, to restore a length of the packet data.

* * * * *